United States Patent [19]

Yamamoto

[11] Patent Number: 4,823,190
[45] Date of Patent: Apr. 18, 1989

[54] APPARATUS FOR ENHANCING CONTOURS OF TELEVISION SIGNAL

[75] Inventor: Kazumi Yamamoto, Tokyo, Japan

[73] Assignee: Ikegami Tsushinki Co., Ltd., Tokyo, Japan

[21] Appl. No.: 32,226

[22] Filed: Mar. 31, 1987

[30] Foreign Application Priority Data

Apr. 11, 1986 [JP] Japan .................................. 61-82360

[51] Int. Cl.$^4$ ............................................ H04N 5/208
[52] U.S. Cl. ........................................ 358/166; 358/37
[58] Field of Search ................ 358/166, 37, 162, 284, 358/168, 167

[56] References Cited

U.S. PATENT DOCUMENTS

| 4,030,121 | 6/1977 | Faroudja | 358/37 |
|---|---|---|---|
| 4,071,782 | 1/1978 | Vidovic | 358/37 X |
| 4,086,618 | 4/1978 | Koubek | 358/166 |
| 4,091,420 | 5/1978 | Omori et al. | 358/166 |
| 4,200,888 | 4/1980 | Blom | 358/162 |
| 4,263,616 | 4/1981 | Lee | 358/166 |
| 4,295,164 | 10/1981 | Rauser | 358/166 |
| 4,360,830 | 11/1982 | Poetsch et al. | 358/37 X |
| 4,414,564 | 11/1983 | Hitchcock | 358/166 X |
| 4,541,014 | 9/1985 | Yagi | 358/162 X |
| 4,559,558 | 12/1985 | Hosoya et al. | 358/162 |
| 4,635,120 | 1/1987 | Ichinoi | 358/167 |
| 4,647,960 | 3/1987 | Miura et al. | 358/166 X |
| 4,652,918 | 3/1987 | Liu et al. | 358/166 X |
| 4,667,225 | 5/1987 | Kanda | 358/167 X |
| 4,667,234 | 5/1987 | Kluth | 358/166 |
| 4,668,988 | 5/1987 | Sasaki et al. | 358/37 X |
| 4,706,113 | 11/1987 | Ito et al. | 358/166 X |
| 4,709,269 | 11/1987 | Ozaki | 358/167 |
| 4,729,019 | 3/1988 | Rouvrais | 358/166 X |
| 4,733,300 | 3/1988 | Sugiyama et al. | 358/166 X |
| 4,748,500 | 5/1988 | Lacoste et al. | 358/37 |

FOREIGN PATENT DOCUMENTS

| 3418794 | 11/1985 | Fed. Rep. of Germany | 358/162 |
|---|---|---|---|
| 2067045 | 7/1981 | United Kingdom | 358/162 |

Primary Examiner—Edward L. Coles, Sr.
Assistant Examiner—E. Anne Faris
Attorney, Agent, or Firm—Spencer & Frank

[57] ABSTRACT

An apparatus for effecting contour enhancement in a non-linear manner, in accordance with the amplitude of a contour signal, includes an upper limiter for clipping a portion of the contour signal exceeding an upper level and a lower limiter for clipping a portion of the contour signal below a lower level. The gain of the contour signal for a brightness signal having a large level difference is decreased relative to the gain of the contour enhancement signal for a brightness signal having a small level difference, and thus glare and cross-color noise can be reduced materially, while the contour for a brightness signal having a small level difference can be enhanced sufficiently.

12 Claims, 6 Drawing Sheets

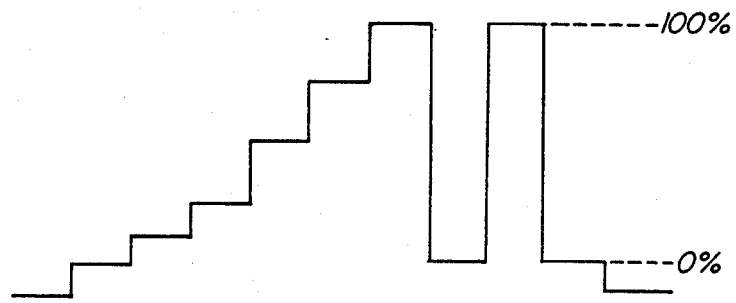
FIG_1A
PRIOR ART
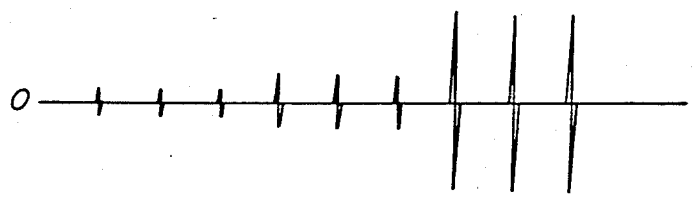
FIG_1B
PRIOR ART
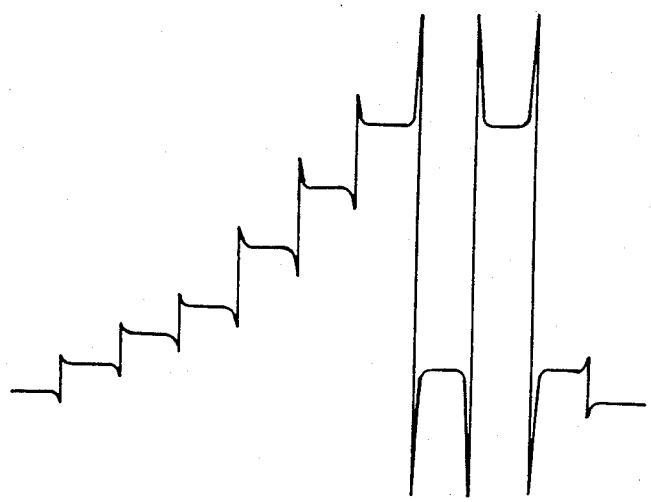
FIG_1C
PRIOR ART

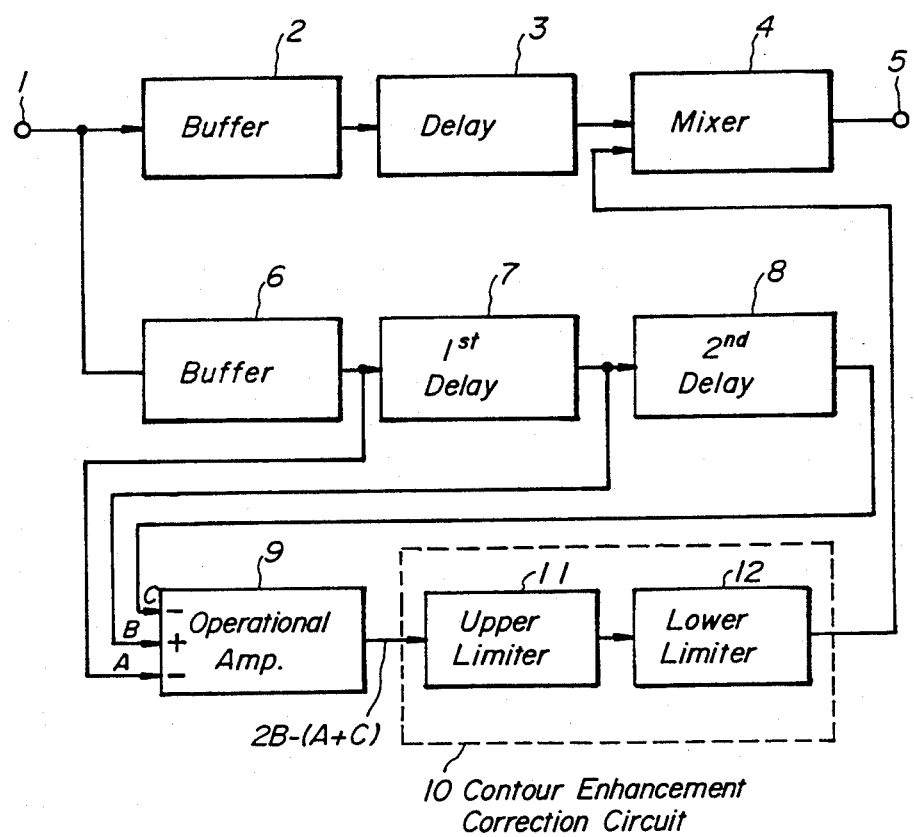
FIG_2

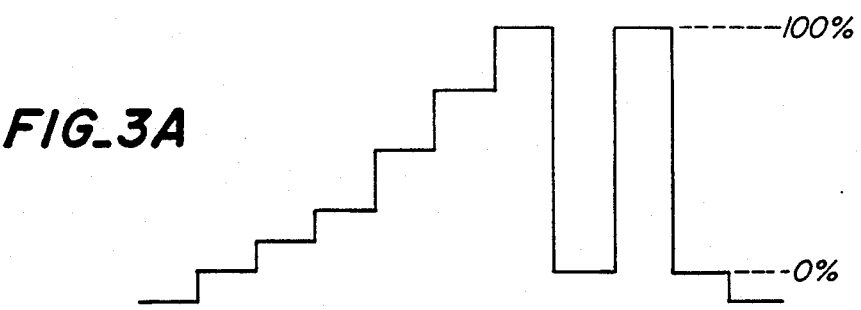
FIG_3A
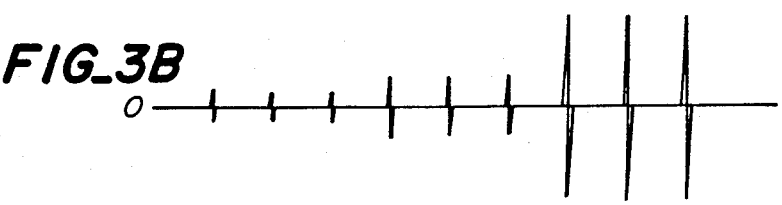
FIG_3B
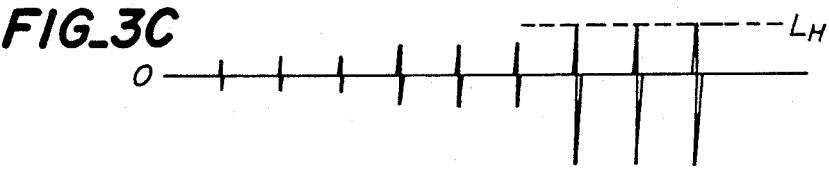
FIG_3C
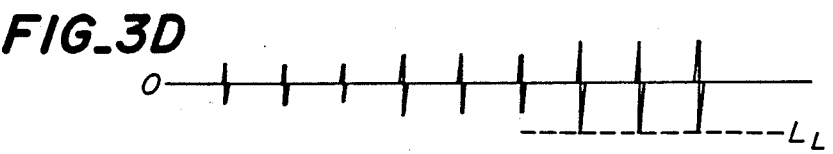
FIG_3D
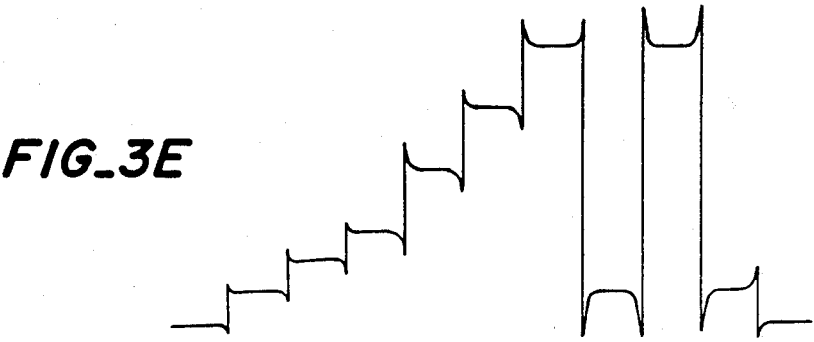
FIG_3E FIG_5
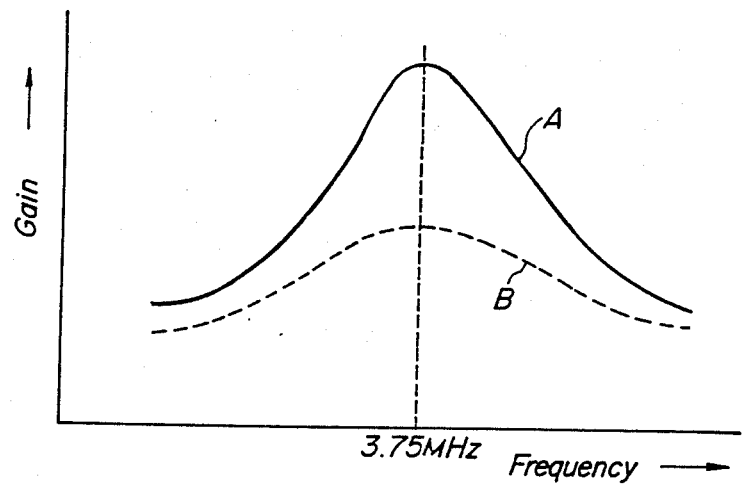
FIG_6
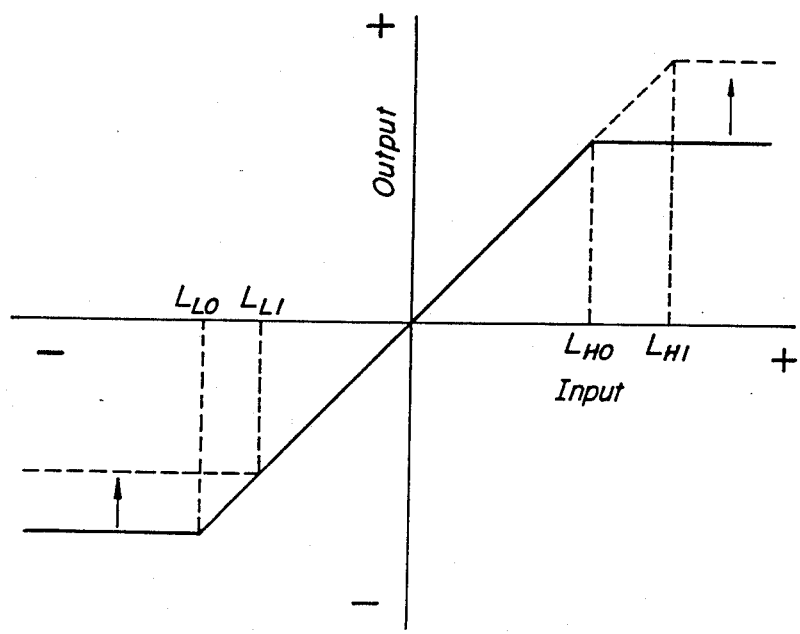

APPARATUS FOR ENHANCING CONTOURS OF TELEVISION SIGNAL

BACKGROUND OF THE INVENTION

Field of the Invention and Related Art Statement

The present invention relates to an apparatus for enhancing contours of a television signal, and more particularly to a contour enhancing apparatus which is advantageously installed in a television camera.

In a television camera a contour enhancer is generally provided for improving the sharpness of a reproduced image of an object, i.e. the definition of edges of the image to be picked-up. In the known contour enhancer, a brightness signal as shown in FIG. 1A is first differentiated to derive a contour signal as illustrated in FIG. 1B. In a color television camera, in general, the green color signal is used to derive the contour signal. Then, a contour enhancement signal is produced in proportion to the amplitude of the contour signal, and the contour enhancement signal is added to the original brightness signal to obtain a contour enhanced television signal shown in FIG. 1C. In case of the color television camera, the contour enhancement signal is added to the red, blue and green color signals, respectively. In the known contour enhancer, the amplitude or gain of the contour enhancement signal is proportional to that of the contour signal. Therefore, as illustrated in FIG. 1C, a contour enhancement signal having a small amplitude is added to a brightness signal having a small level difference and a contour enhancement signal of a large amplitude is added to a brightness signal having a large amplitude difference.

In the known contour enhancer, a video engineer can adjust the gain of the contour enhancement signal. For a general object, the brightness signal contains relatively small level differences, so that the gain of the contour enhancement signal is adjusted such that a contour having relatively small level differences in the brightness signal can be correctly enhanced so as to improve the sharpness of the image of the object. Therefore, when a brightness signal has a large level difference, a so-called over-enhancement might occur, and undesired glare might be manifest in an image reproduced on a monitor. Particularly, in a color television camera of the NTSC system, when the object contains frequency components near a subcarrier frequency of a composite color video signal, there might be produced large cross-color noise, and the quality of the reproduced image might deteriorate to a great extent. In order to suppress such cross-color noise, when the gain of the contour enhancement signal is decreased, the contour of a brightness signal having a small level difference could not be sufficiently enhanced, and the sharpness of the reproduced image might be lost.

The above mentioned cross-color noise is generated in the contour enhancement in the horizontal direction. It should be noted that when a brightness signal has a large level difference in the vertical direction, the vertical contour might be enhanced excessively. For instance, when cut surfaces of a diamond placed on a black velvet are to be picked-up, the contour of the diamond with respect to the black background is enhanced excessively, but the contrast of the cut surfaces might not be enhanced sufficiently. In this manner, it is difficult to obtain an image having the desired contrast. In such a case, when the gain of the contour enhancement signal is reduced so as not to enhance the contour of the diamond excessively, the contour of the cut surfaces might not be reproduced sufficiently.

SUMMARY OF THE INVENTION

The present invention has for its object to provide a novel and useful apparatus for enhancing contours of a television signal, said apparatus being able to effect, on one hand, non-excessive enhancement for a brightness signal having a large level difference to suppress the glare and cross-color noise, and on the other hand, a sufficient enhancement for a brightness signal having a small level difference, so that the sharpness and contrast of a reproduced image can be improved sufficiently and optimally.

According to the invention, an apparatus for enhancing contours of an image signal comprises contour signal producing means for extracting a contour signal from an image signal whose contours are to be enhanced;

contour enhancement signal producing means for processing said contour signal non-linearly in accordance with the amplitude of the contour signal to derive a contour enhancement signal; and means for adding said contour enhancement signal to said image signal.

BRIEF DESCRIPTION OF THE DRAWINGS

FIGS. 1A to 1C are signal waveforms for explaining the operation of the known contour enhancer;

FIG. 2 is a block diagram illustrating a principal construction of the contour enhancer according to the invention;

FIGS. 3A to 3E are signal waveforms for explaining the operation of the contour enhancer according to the invention;

FIG. 5 is a graph depicting a property of a frequency characteristic control circuit shown in FIG. 4;

FIG. 6 is a graph representing characteristics of a contour enhancement correction circuit shown in FIG. 4;

DESCRIPTION OF THE PREFERRED EMBODIMENTS

Figure 4:
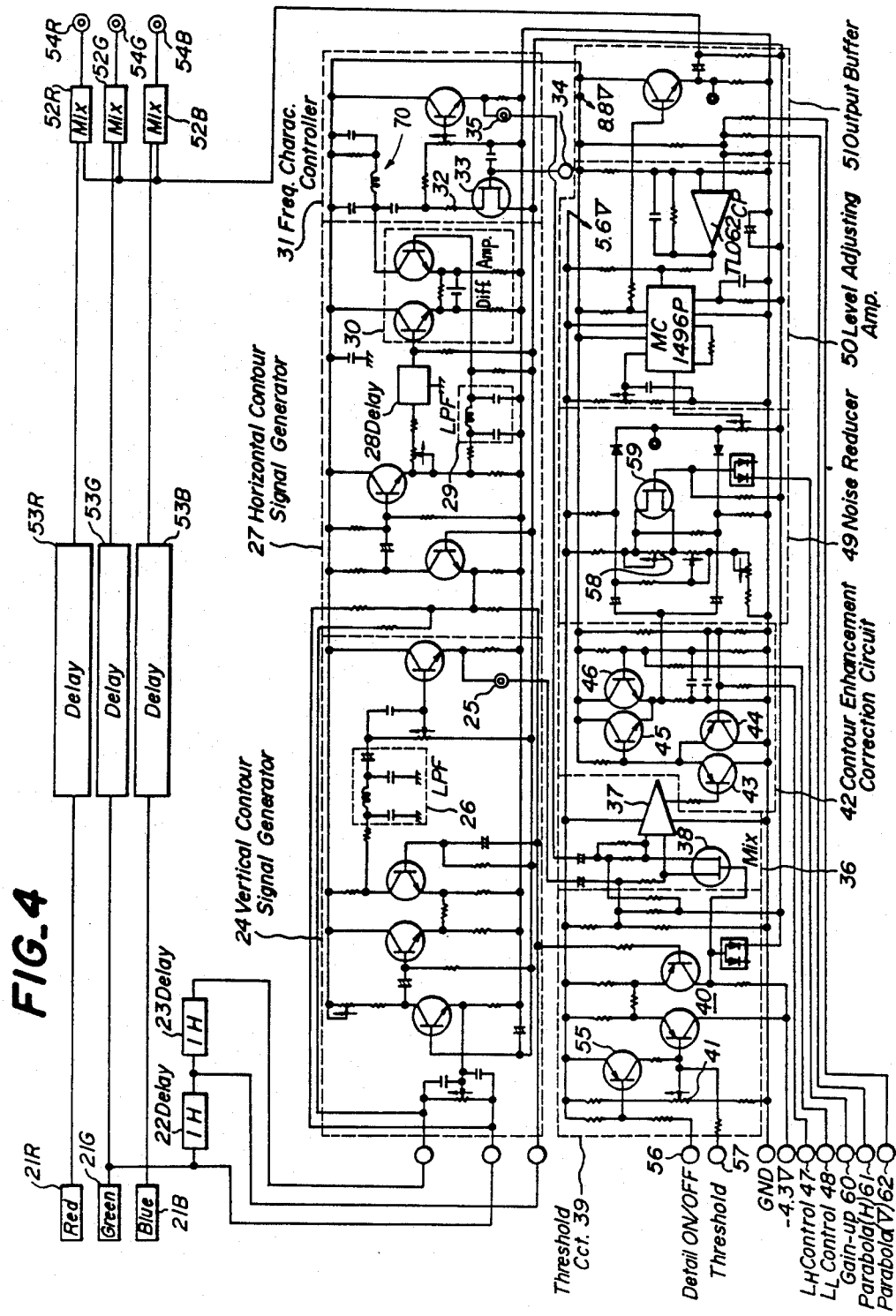
FIG. 4 is a block diagram showing a color television camera comprising an embodiment of the contour enhancer according to the invention.

FIG. 2 is a block diagram showing a principal construction of an embodiment of the contour enhancing apparatus according to the invention. A brightness signal whose contours are to be enhanced is supplied from an input terminal 1 to one input of a mixing circuit 4 via a buffer circuit 2 and a delay circuit 3. The brightness signal is also supplied through a buffer circuit 6 to first and second delay circuits 7 and 8, successively.

An output signal A from the buffer circuit 6, and output signals B and C from the first and second delay circuits 7 and 8, are supplied to an operational amplifier 9 which produces at its output a contour signal 2B−(A+C). This contour signal is the same as the known contour signal shown in FIG. 1B. According to the invention, the contour signal thus detected is supplied to a contour enhancement correction circuit 10. In this embodiment, the contour enhancement correction circuit 10 comprises an upper limiter 11 for suppressing or cutting contour signal components above a predetermined level, and a lower limiter 12 for cutting contour signal components below a predetermined lower level. That is, the contour enhancement correction circuit 10 has a non-linear characteristic with respect to the amplitude of the contour signal. The output signal of the contour enhancement correction circuit 10 is supplied to the other input of the mixing circuit 4. In this manner a brightness signal having a non-linear contour enhancement signal added thereto is supplied to an output terminal 5.

In the contour enhancing apparatus of the present embodiment, from the brightness signal illustrated in FIG. 3A the contour signal shown in FIG. 3B is derived by the operational amplifier 9. In case of effecting contour enhancement in the horizontal direction, the first and second delay circuits 7 and 8 may have a delay time of 50 to 100 nano seconds, but for contour enhancement in the vertical direction the delay time of the first and second delay circuits 7 and 8 may be set to one horizontal scanning period (1H). The delay circuit 3 is provided for compensating a possible time delay in the circuit for producing the contour enhancement signal so that phases of the signals to be mixed in the mixing circuit 4 are made coincident with each other.

When the contour signal supplied from the operational amplifier 9 is passed through the upper limiter 11, signal components which exceed a predetermined upper threshold level $L_H$ are clipped as shown in FIG. 3C. Further, when the contour signal is passed through the lower limiter 12, signal components below a predetermined lower threshold level $L_L$ are also clipped at this level as illustrated in FIG. 3D. When the contour enhancement signal whose upper and lower components have been clipped off is added to the original brightness signal in the mixing circuit 4, it is possible to obtain a brightness signal whose contours have been enhanced as illustrated in FIG. 3E. According to the present embodiment, a non-suppressed contour enhancement signal is superimposed on a portion of the brightness signal having a small level difference so that the sharpness of the reproduced image is improved, while a contour enhancing signal having a limited amplitude is added to a portion of the brightness signal having a larger level difference so that over-enhancement can be avoided and glare and cross-color noise can be suppressed effectively.

According to the invention, the contour enhancement signal is processed by a contour enhancement correction circuit having a non-linear characteristic. This non-linear characteristic may be realized in various ways. For instance, in the above embodiment, the gain of the contour enhancement signal is suppressed for a brightness signal having a large level difference. It is also possible to increase the gain of the contour enhancement signal for a brightness signal having a small amplitude difference. Further, the gain of the contour enhancement signal for a brightness signal having a large level difference may be selectively increased.

FIG. 4 is a circuit diagram showing an embodiment of a color television camera having the contour enhancing apparatus according to the invention. The camera comprises red, green and blue pick-up devices, e.g. pick-up tubes 21R, 21G and 21B. The output signal from the green pick-up device 21G is supplied to one-line delay circuits 22 and 23 successively to derive a non-delay signal, an one-line delay signal and a two-line delay signal. These signals are supplied to a circuit 24 for generating a contour signal in the vertical direction. The vertical contour signal generating circuit 24 comprises a noise removing filter 26 composed of a low pass filter so as to prevent noise from being introduced in the contour signal. The one-line delay signal is also supplied to a circuit 27 for generating a contour signal in the horizontal direction. The horizontal contour signal generating circuit 27 comprises a delay line 28 having a delay time of 100 nano seconds, a low pass filter 29 and a differential amplifier 30. The differential amplifier 30 produces the horizontal contour signal as a difference between the signal passed through the delay line 28 and the signal passed through the low pass filter 29. The horizontal contour signal is supplied to a frequency characteristic control circuit 31. This control circuit 31 includes a resonance circuit or filter 20 having a resonance frequency of a color subcarrier frequency. By driving an FET switch 33 connected in series with a resistor 32 into ON/OFF condition by adjusting a voltage applied at a terminal 34, the resistor 32 is connected into or disconnected out of the circuit so that a figure of merit Q of the resonance circuit is changed between two values.

FIG. 5 is a graph showing a frequency characteristic of the frequency characteristic controlling circuit 31. Curve A represents a frequency characteristic when the switch 33 is OFF and the resistor 32 is disconnected from the circuit. Broken line B depicts a frequency characteristic when the resistor 32 is connected into the circuit by making the FET switch 33 ON, so that the figure of merit Q of the resonance circuit is decreased. When Q is made high, a so-called hard image is obtained, and when Q is switched into a low value, a so-called soft image is reproduced.

The vertical and horizontal contour signals appearing at the output terminals 25 and 35, respectively are mixed with each other in a mixing circuit 36. The mixing circuit 36 comprises an operational amplifier 37 whose inputs may be short-circuited by means of a switch 38 consisting of an FET. The operational amplifier 37 may be an integrated circuit μA 733HC. The gate electrode of the FET switch 38 is connected to a threshold circuit 39. The threshold circuit 39 comprises a differential amplifier 40, to one input of which is supplied the one-line delay signal, and to the other input of which is supplied a threshold voltage which may be adjusted by a potentiometer 41. When the one-line delay signal is lower than the threshold voltage, the output voltage of the threshold circuit 39 is at a low level and the FET switch 38 is made conductive. Therefore, the inputs of the operational amplifier 37 are short-circuited and the output voltage becomes zero. Therefore, the contour enhancement is not effected at all. When the one-line delayed brightness signal is higher than the threshold voltage, the FET switch 38 becomes non-conductive and the operational amplifier 37 produces an output signal which is a sum of the horizontal contour signal and vertical contour signal. This output signal is applied to a contour enhancement correction circuit 42. This circuit 42 comprises an upper limiter having transistors 43 and 44, and a lower limiter including transistors 45 and 46. The upper and lower threshold levels ($L_H$ and $L_L$ in FIGS. 3C and 3D) can be adjusted by means of voltages applied to terminals 47 and 48, respectively. In this manner, the mixed contour signal is clipped with respect to the lower and upper threshold levels. Then, the contour enhancement signal is supplied to a noise reducing circuit 49 so that signal portions which are below a certain level are considered to be noise and are removed. Further, the contour enhancement signal is supplied to a level control amplifier 50 having integrated circuits MC 1496P and TL 062CP and is amplified to a given level. Then the contour enhancement signal is supplied to an output buffer circuit 51 which generates a contour enhancement signal. The contour enhancement signal thus generated is supplied to mixing circuits 52R, 52G and 52B and is added to the red, green and blue signals, which are supplied from the pick-up devices 21R, 21G and 21B via delay circuits 53R, 53G and 53B, respectively. In this manner, at output terminals 54R, 54G and 54B there are produced red, green and blue color signals having suitably enhanced contours.

In the present embodiment, the contour enhancement correction circuit 42 has an input-output characteristic shown in FIG. 6. By changing the upper level from $L_{H0}$ to $L_{H1}$ and also the lower level from $L_{L0}$ to $L_{L1}$ by changing the voltages applied at the terminals 47 and 48, the input-output characteristic may be changed as illustrated by broken lines. Therefore, by suitably combining the input-output characteristic of the contour enhancement correction circuit 42 and the figure of merit Q of the frequency characteristic control circuit 31, it is possible to effect various contour enhancements for various objects. In this manner, the variety of the image expression can be increased materially.

In the embodiment of the contour enhancer shown in FIG. 4, the threshold circuit 39 includes a transistor 55. When a control voltage is applied to a terminal 56 so that the transistor 55 is made conductive, the contour enhancement is switched off. Further, by adjusting a control voltage applied to a terminal 57, the threshold voltage applied to the other input of the differential amplifier 40 is predominantly adjusted, and thus the threshold level of the brightness signal at which the contour enhancement begins can be changed.

The noise reducer 49 comprises a potentiometer 58 and an FET switch 59. By adjusting the potentiometer 58, it is possible to change the threshold level at which the suppression of the contour enhancement signal is effected. When the FET switch 59 is ON, because of a gain-up control voltage applied to a terminal 60, the threshold level is decreased to zero and the noise reducing function is not effected.

The image pick-up devices 21R, 21G and 21B do not have uniform properties over their respective input surfaces. The properties deteriorate at the peripheries, and therefore the definition of the image decreases toward the periphery. In order to correct such a drawback, to terminals 61 and 62 are applied parabolic correction voltages having periods of horizontal and vertical scanning periods H and V, respectively. Then, the gain of the contour enhancement signal is increased toward the periphery of the image and the definition of the image is made uniform over the whole area.

The present invention is not limited to the embodiments explained above, but may be modified in various manners. For instance, the contour enhancement correction circuit 42 does not necessarily comprise the limiters. The contour enhancement correction circuit may comprise a compression circuit having the input-output characteristic shown in FIG. 7.

Figure 7:
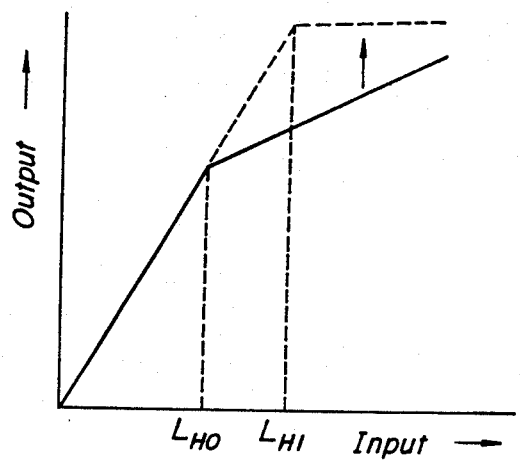
FIG. 7 is a graph showing characteristics of another embodiment of the contour enhancement correction circuit.
Figure 8:
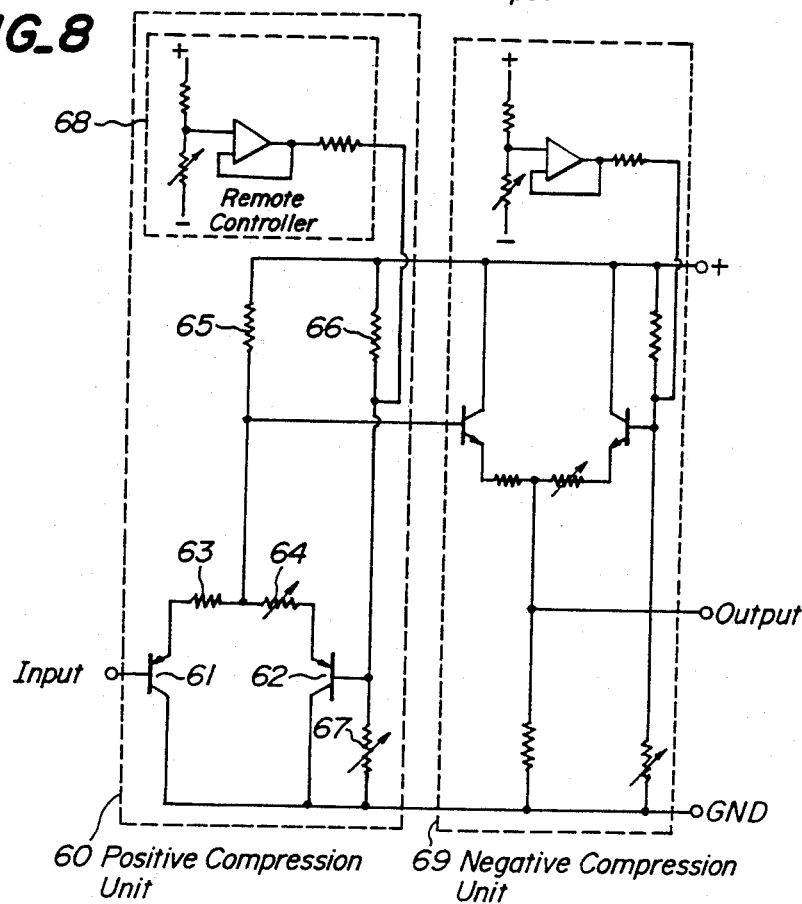
FIG. 8 is a circuit diagram illustrating an embodiment of the contour enhancement correction circuit having the characteristics shown in FIG. 7.

FIG. 8 is a circuit diagram showing an embodiment of the compression circuit having the characteristic illustrated in FIG. 7. The compression circuit comprises positive and negative contour signal compressing units 60 and 69. The positive contour signal compressing unit 60 comprises transistors 61, 62 and resistors 63, 64, 65, 66 and 67. When the input signal is lower than a base potential $L_{H0}$ of the transistor 66 determined by the values of the resistors 66 and 67, the unit shows the linear characteristic. When the input signal level exceeds the threshold level, the gain of the output signal is decreased at a rate of $(R_{64})/(R_{63}+R_{64})$, wherein $R_{63}$ and $R_{64}$ are the resistance values of the resistors 63 and 64, respectively. Therefore, the gain for a large contour signal becomes small relative to the gain for a small contour signal, and thus excessive contour enhancement can be suppressed. Further, by adjusting the variable resistor 64, it is possible to change the rate of compression as illustrated by a broken line in FIG. 7. Further, an input level at which the compression starts can be changed by a remote control device 68. The construction and operation of the negative contour signal compression unit 69 are similar to those of the positive contour signal compression unit 60 and their detailed explanation is omitted.

In the contour enhancing apparatus according to the invention, the gain of the contour enhancement signal is reduced for an image signal having a large level difference, so that excessive contour enhancement can be avoided effectively. Therefore, glare is not produced at the contours of the image and cross-color noise can be avoided. Further, the gain of the contour enhancement signal for an image signal having a small level difference is not reduced and thus the sharpness of the displayed image does not deteriorates. Moreover, by designing the non-linear property of the contour enhancement correction circuit in various manners, it is possible to achieve optimal contour enhancement for various objects, so that the variety of the video expression can be increased materially.

What is claimed is:

1. An apparatus for enhancing contours of an image signal having a color subcarrier, comprising:
   contour signal producing means for extracting a contour signal from an image signal whose contours are to be enhanced;
   means for filtering said contour signal to produce a filtered contour signal, said means for filtering having a center frequency near the color subcarrier frequency and having a figure of merit Q;
   means for selectively changing the figure of merit Q, said means for selectively changing the figure of merit Q including a series combination of a resistor and a semiconductor switch, the series combination being connected to the means for filtering;
   contour enhancement signal producing means for processing said filtered contour signal non-linearly in accordance with the amplitude of the filtered contour signal to derive a contour enhancement signal; and
   means for adding said contour enhancement signal to said image signal.

2. An apparatus according to claim 1, wherein said contour enhancement signal producing means is constructed such that the gain of the contour enhancement signal for an image signal having a large level difference is reduced relative to the gain of a contour enhancement signal for an image signal having a small level difference.

3. An apparatus according to claim 1, wherein said contour enhancement signal producing means comprises an upper limiter for clipping a portion of the filtered contour signal exceeding an upper threshold level and a lower limiter for clipping a portion of the filtered contour signal below a lower threshold level.

4. An apparatus according to claim 3, wherein said contour enhancement signal producing means further comprises means for adjusting said upper and lower threshold levels.

5. An apparatus according to claim 2, wherein said contour enhancement signal producing means comprises a first compression unit for compressing a portion of the filtered contour signal exceeding an upper threshold level, and a second compression unit for compressing a portion of the filtered contour signal smaller than a lower threshold level.

6. An apparatus according to claim 5, wherein said first and second compression units comprise first and second means for adjusting said upper and lower threshold levels, respectively.

7. An apparatus according to claim 6, wherein said first and second compression units further comprise first and second means for adjusting compression rates.

8. An apparatus according to claim 3, further comprising a threshold circuit means for suppressing a portion of the filtered contour signal below a threshold level.

9. An apparatus according to claim 8, wherein said threshold circuit means comprises means for adjusting said threshold level.

10. An apparatus according to claim 3, further comprising means for changing the gain of the contour enhancement signal in accordance with a position on an image.

11. An apparatus according to claim 1, wherein said image signal has a changeable signal level, wherein said filtered contour signal has a constant value when the level of the image signal does not change and has positive and negative portions with respect to the constant value if the level of the image signal does change, and wherein said contour enhancement signal producing means processes said filtered contour signal non-linearly by processing both the positive and negative portions non-linearly.

12. An apparatus for enhancing contours of an image signal having a color subcarrier, comprising:

contour signal producing means for extracting a contour signal from an image signal whose contours are to be enhanced;

means for filtering said contour signal to produce a filtered contour signal, said means for filtering having a center frequency near the color subcarrier frequency and having a figure of merit Q;

means for selectively changing the figure of merit Q;

contour enhancement signal producing means for processing said filtered contour signal non-linearly in accordance with the amplitude of the filtered contour signal to derive a contour enhancement signal, said contour enhancement signal producing means including an upper limiter for clipping a portion of the filtered contour signal exceeding an upper threshold level and a lower limiter for clipping a portion of the filtered contour signal below a lower threshold level;

means for changing the gain of the contour enhancement signal in accordance with a position on an image, said means for changing the gain including means for increasing the gain toward the periphery of the image; and means for adding said contour enhancement signal to said image signal.

* * * * *